(12) United States Patent
Strashny

(10) Patent No.: US 12,734,894 B2
(45) Date of Patent: Sep. 15, 2026

(54) FLUID CONTROL SYSTEM

(71) Applicant: Caterpillar Inc., Peoria, IL (US)

(72) Inventor: Igor Strashny, Tucson, AZ (US)

(73) Assignee: Caterpillar Inc., Peoria, IL (US)

( * ) Notice: Subject to any disclaimer, the term of this patent is extended or adjusted under 35 U.S.C. 154(b) by 447 days.

(21) Appl. No.: 18/525,246

(22) Filed: Nov. 30, 2023

(65) Prior Publication Data

US 2025/0178445 A1 Jun. 5, 2025

(51) Int. Cl.
*B60L 5/38* (2006.01)

(52) U.S. Cl.
CPC ............. *B60L 5/38* (2013.01); *B60L 2200/36* (2013.01)

(58) Field of Classification Search
CPC ...... B60L 5/38; B60L 5/39; B60L 5/40; B60L 5/42; B60L 2200/36
See application file for complete search history.

(56) References Cited

U.S. PATENT DOCUMENTS 4,155,434 A * 5/1979 Howell, Jr. .............. B60M 1/30 104/246
4,234,065 A * 11/1980 Uozumi .................... B60L 5/36 191/29 R
5,528,901 A * 6/1996 Willis ........................ F02N 7/08 123/142.5 R
8,893,830 B2 * 11/2014 Ruth ........................ B60M 7/00 180/2.1
2013/0126250 A1 5/2013 Ruth
2015/0191897 A1 7/2015 Zhang
2017/0015372 A1 1/2017 Strong
2021/0188095 A1 * 6/2021 Wolff ...................... B60L 5/005
2022/0297574 A1 * 9/2022 Forestier ................... B60L 9/04
2023/0163526 A1 * 5/2023 Strashny ................... B60L 5/32 439/34
2023/0231350 A1 * 7/2023 Strashsny ............... B60L 5/085 191/45 R
2023/0323902 A1 10/2023 Ramanathan

FOREIGN PATENT DOCUMENTS

EP 4257411 A1 * 10/2023 .............. B60L 50/53
WO WO-2014063924 A2 * 5/2014 ................ B60L 7/26

* cited by examiner

*Primary Examiner* — Robert J McCarry, Jr.
(74) *Attorney, Agent, or Firm* — Bookoff McAndrews PLLC

(57) ABSTRACT

A fluid control system for controlling pressurized fluid within a mobile energy transfer system, the control system including a compressor configured to pressurize a fluid, an accumulator configured to store the pressurized fluid from the compressor, and a pneumatic control valve for controlling movement for a connecting arm assembly and movement of a plurality of extendable brushes. The fluid control system may include the use of an extension fluid pathway for extending the downstream components and a retraction fluid pathway for retracting the downstream components and regenerating pressure for the control system.

20 Claims, 3 Drawing Sheets

240
242
244
246
248
260
262
264
330
328
300
302
304
306
308
310
312
314
316
318
320
322
324
326
220
222

FLUID CONTROL SYSTEM

TECHNICAL FIELD

The present disclosure relates generally to a control system for a mobile machine and, more specifically, a fluid control system for pneumatically manipulating and connecting a rail connector assembly to a conductive rail system.

BACKGROUND

Mobile industrial machines, such as earth-moving machines, can be of substantial weight and can bear immense loads, thus requiring a large amount of power. Many industrial machines are driven by internal combustion engines. However, internal combustion engines have drawbacks such as fuel costs, fuel transport difficulties, and detrimental engine emissions. Accordingly, there has been a movement toward powering large mobile industrial machines with hybrid or all-electric power systems.

While hybrid and all-electric power systems for industrial machines are beneficial for alleviating fuel costs and emission concerns, these systems present challenges. For example, the use of hybrid or all-electric systems in an industrial capacity requires a significant investment in infrastructure, particularly due to the location of industrial worksites. While the use of overhead electricity-conducting lines is one solution for powering vehicles with predetermined routes or terrain (e.g., trains, subways, buses, etc.), overhead lines are not practical for all machines or worksites, such as freely-steerable industrial machines and worksites with uneven terrain. As a result, existing power systems, such as overhead lines, are not typically used in remote and uneven environments. Further, it can be difficult to properly align and couple such power conducting lines to a machine for proper energy transfer. Such problems can lead to project delays and machine downtime.

A system for providing electric power to a traveling vehicle is described in International Patent App. Pub. No. WO 2020/186296 A1, published on Sep. 24, 2020 ("the '296 publication"). The system described in the '296 publication includes an electrical delivery system at a mine site for a moving vehicle where two electricity conductors are anchored to relocatable roadside barriers. In order to charge the moving vehicle, the delivery system provides a retractable arm extending from the vehicle that aligns with electrical connectors embedded within a horizontal channel of the roadside barriers. While the system described in the '296 publication may be helpful in some circumstances, the '296 publication does not describe a control system to connect or disconnect the electrical delivery system to the roadside electrical conductors.

Aspects of the present disclosure may solve one or more of the problems set forth above and/or other problems in the art. The scope of the current disclosure, however, is defined by the attached claims, and not by the ability to solve any specific problem.

SUMMARY

In one aspect, a pneumatic control system for a mobile machine energy transfer system, the mobile machine energy transfer system including a boom, a connecting arm assembly including a plurality of connecting arms, and a contactor assembly including a plurality of extendable brushes, the pneumatic control system including: a compressor configured to pressurize a fluid; an accumulator configured to store the pressurized fluid from the compressor; and an pneumatic control valve for controlling movement of the plurality of connecting arms and movement of the plurality of extendable brushes, wherein the pneumatic control valve includes an extension fluid pathway for conveying the pressurized fluid from the accumulator to the plurality of extendable brushes, wherein the extension fluid pathway fluidly connects the pneumatic control valve to the plurality of connecting arms and to the plurality of extendable brushes.

In another aspect, a pneumatic control system for a mobile machine energy transfer system, the pneumatic control system including: a compressor configured to pressurize fluid; an accumulator configured to store the pressurized fluid; and a pneumatic control valve for controlling movement of the plurality of connecting arms and movement of the plurality of extendable brushes, wherein the compressor, the accumulator, and the pneumatic control valve are connected in series along a first fluid pathway for conveying the pressurized fluid to the connecting arm assembly and the contactor assembly, and wherein the pneumatic control valve includes a second fluid pathway, different from the first fluid pathway, for conveying the pressurized fluid away from the connecting arm assembly and away from the contactor assembly.

In yet another aspect, a pneumatic control system for a mobile machine energy transfer system, the mobile machine energy transfer system including a boom, a connecting arm assembly including a plurality of connecting arms, and a contactor assembly including a plurality of extendable brushes, the pneumatic system including: a compressor, wherein the compressor is configured to pressurize fluid; an accumulator; a pneumatic control valve for controlling flow of the pressurized fluid into the plurality of connecting arms and for the plurality of extendable brushes; and a brush pressure relay valve for regulating pressure of the pressurized fluid within the plurality of extendable brushes of the contactor assembly, the brush pressure relay valve including a resting pressure state and an actuated pressure state, wherein the resting pressure state includes an input pathway for the pressurized fluid to be conveyed into the plurality of extendable brushes and the actuated pressure state includes an isolated pathway that prevents flow of the pressurized fluid from entering the contactor assembly.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, “about,” “substantially,” and “approximately” are used to indicate a possible variation of ±10% in the stated value.

As used herein, the term “upstream” is intended to cover the components, parts, assemblies, and systems located at an entry end or a proximal portion of a rail connection assembly of a mobile machine. Conversely, the term “downstream” is intended to cover the components, parts, assemblies, and systems located at a distal end or portion of the rail connection assembly, away from a body of the mobile machine.

Figure 1:
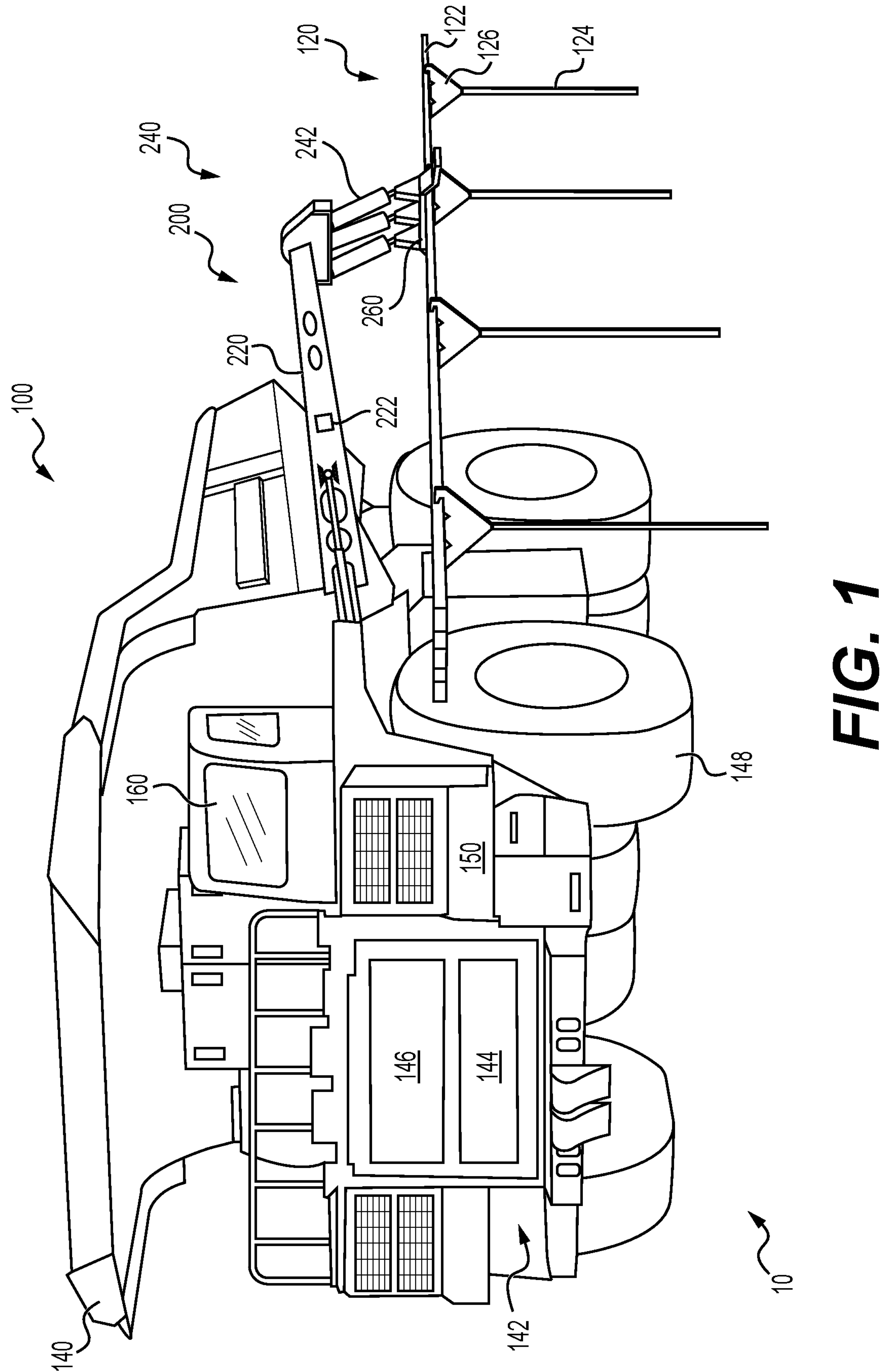
FIG. 1 is a perspective view of an electric mobile machine connected to a power source using a conductive rail system with a rail connector system, including a pivoting boom, a trailing arm assembly, and a contactor assembly, according to aspects of the present disclosure.

FIG. 1 depicts a mobile machine power system 100, according to aspects of the present disclosure. The mobile machine power system 100 includes a conductive rail system 120 and a mobile machine 140. The conductive rail system 120 includes a plurality of conductor rails 122 connected to a power source (e.g., a power grid, generator, and/or energy storage devices), a plurality of support poles 124 secured to the ground 10, and a bracket assembly 126 attached to a top end of the each of the plurality of support poles 124 to retain the plurality of conducting rails 122 in a secured elevated position at a height ranging from 8-15 feet or other height desirable for safety or other considerations.

The mobile machine 140 includes an electric drive system 142 having at least one electric motor 144 and at least one battery system 146. The electric drive system 142 moves a set of ground-engaging elements 148, such as tires or continuous tracks, for propelling and maneuvering the mobile machine 140. The mobile machine 140 also includes a frame 150 which supports the mobile machine’s mechanical components, including a rail connector assembly 200 that connects to the conductive rail system 120 and transfers electrical energy to the mobile machine 140. The mobile machine 140 and its various systems are controlled via an operator located in an operator cabin 160. The mobile machine 140 is free-steering, allowing the operator of the machine to control the direction and route of the machine. Mobile machine 140 may utilize either hybrid or all-electric power systems, and the conductive rail system 120 may be applied to either system.

Figure 2:
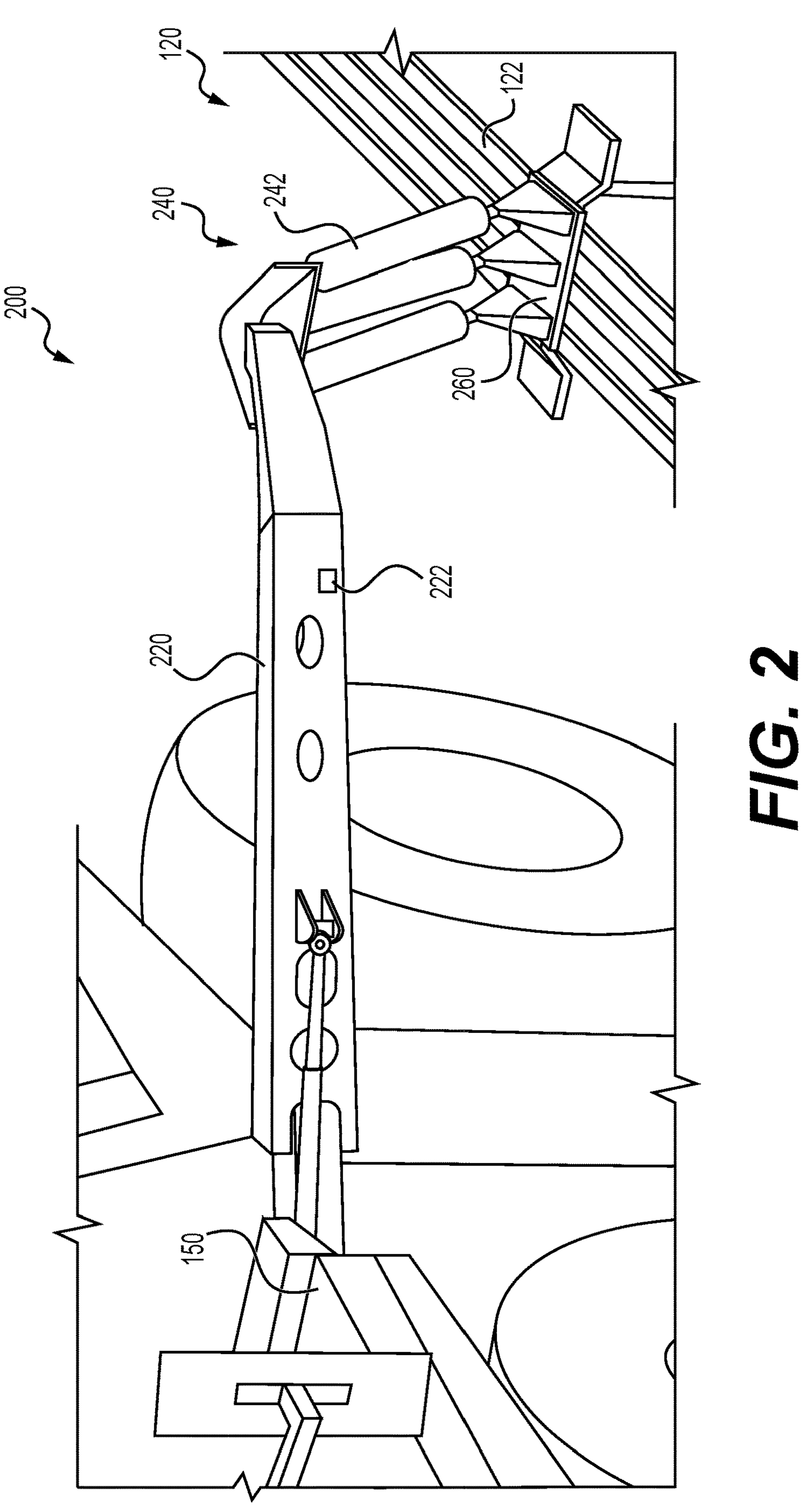
FIG. 2 is a perspective view of the rail connector system shown in FIG. 1.

The rail connector assembly 200, as shown in FIGS. 1 and 2, is controlled by the operator and electrically connects the mobile machine 140 to the conductive rail system 120. The rail connector assembly 200 includes a pivoting boom 220, a connecting arm assembly 240, and a contactor assembly 260. The pivoting boom 220 includes an integrated busbar (not shown) for transferring electrical energy along a length of the pivoting boom 220, a hydraulic system (not shown) for rotatably extending and retracting the boom 220 about a pivot joint (not shown), and a pneumatic pressure system 222 for generating fluid pressure to convey fluid (e.g., air or other suitable fluids capable of being pressurized) to downstream components such as the connecting arm assembly 240 and the contactor assembly 260. The connecting arm assembly 240 includes a plurality of connecting arms 242, with each connecting arm comprising a plurality of telescoping cylinders 244, a piston rod 246 (shown in FIG. 3), and a head portion 248, each of which is shown in FIG. 3.

In FIGS. 1 and 2, the connecting arm assembly 240 is attached to a distal end of the pivoting boom 220, which allows for movement of connecting arm assembly 240 in multiple degrees of freedom in a lateral direction and in a vertical direction, independent of the movement of the pivoting boom 220. The multiple degrees of freedom provide the connecting arm assembly 240 with the ability to accommodate changes in the relative position between the plurality of conductor rails 122 and mobile machine 140 during travel.

FIGS. 1 and 2 also show the contactor assembly 260 attached to a distal end of the connecting arm assembly 240 and configured to electrically connect to the conductive rail system 120 while the contactor assembly 260 slides along the plurality of conductor rails 122. The contactor assembly 260 includes a plurality of conductor terminals for electrically connecting to the plurality of conductor rails 122, with each of the plurality of conductor terminals including an extendable brush 262 and an airbag 264, as shown in FIG. 3. The plurality of extendable brushes 262 may be comprised of carbon-based or metal-based composite materials. For example, a graphite-based composite material may be used.

Figure 3:
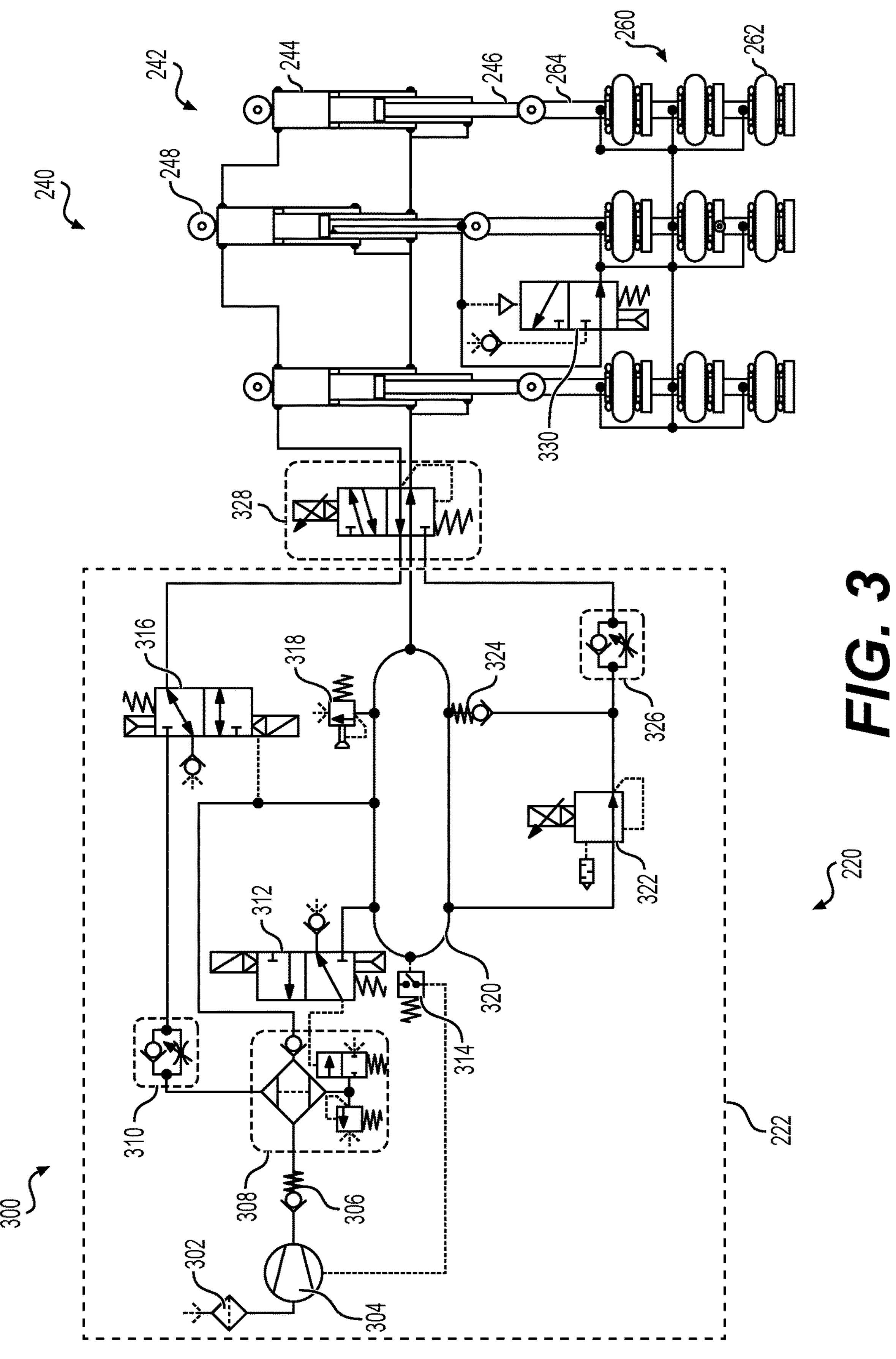
FIG. 3 is a schematic diagram of an exemplary fluid control system.

FIG. 3 shows a schematic diagram of an exemplary fluid control system 300 (also referred to as a “pneumatic control system”) according to aspects of the present disclosure. The fluid control system 300 includes components that generate pressurized fluid (e.g., for the pneumatic pressure system 222) and components that control and manipulate the downstream components in the connecting arm assembly 240 and in the contactor assembly 260.

The fluid control system 300 includes an air intake filter 302, an air compressor 304, a filter dryer 308, a purge valve 312, an accumulator having an accumulator tank 320, a brush pressure control valve 322, a quick retract valve 316, an extend/retract valve 328 (also referred to as a “pneumatic control valve”), and a brush pressure relay valve 330. The system 300 may also include a plurality of check valves and flow controls (e.g., check valves 306 and 324, as well as check valves with flow control 310 and 326) in order to control the direction, pressure, and flow rate of pressurized fluid within the system. For example, as shown in FIG. 3, a check valve 306 may be located between the compressor 304 and the filter dryer 308.

Fluid enters the pneumatic pressure system 222 through the air intake filter 302, which may be directly attached to the air compressor 304. The pressurized fluid is transferred from the air compressor 304 to the filter dryer 308, which includes a plurality of hydroscopic beads and a spring-actuated relief valve for venting the pressurized fluid to the atmosphere. Within the dryer 308, the pressurized fluid flows through the hydroscopic beads, where moisture accumulates via a surface effect. When the removed moisture builds up over time, the moisture is transferred to the purge valve 312 and removed from the fluid control system 300.

The accumulator tank 320 is also fluidly connected to the filter dryer 308, with the accumulator tank 320 storing the pressurized fluid. As shown in FIG. 3, the accumulator tank 320 includes a pressure switch 314 and a safety relief valve 318 that vents pressurized fluid to the atmosphere when necessary. The pressure switch 314 is hysteretically linked to the air compressor 304 and regulates the pressure of the accumulator tank 320 based on a predetermined permissible pressure range. For example, the accumulator tank 320 may store pressurized fluid up to approximately 200 pounds per square inch (PSI) with the predetermined permissible pressure range being from 90 to 120 PSI with a nominal pressure of 100 PSI. If the pressure of the accumulator tank 320 is determined to fall below the predetermined floor of the permissible pressure range, the pressure switch 314 may engage the air compressor 304 to increase the pressure of the accumulator tank; however, if the pressure of the accumulator tank is greater than the predetermined ceiling, the operation of the air compressor may be paused until the pressure is regulated or reduced to within the permissible pressure range. Similarly, the safety relief valve 318 may be either manually or electrically actuated to vent an over-pressurized accumulator tank 320 to the atmosphere. For example, the safety relief valve 318 may include a safety pressure setting that is equal to or greater than the permissible pressure range for normal operation of the accumulator tank 320. If the pressure of the accumulator tank 320 exceeds the safety pressure setting, the safety relief valve 318 may be actuated and release the pressure contained within the accumulator tank to the atmosphere, reducing the tank to a zero-energy state. The accumulator tank 320 is also connected to the brush pressure control valve 322 and the extend/retract valve 328, as shown in FIG. 3. The brush pressure control valve 322 may allow for the dynamic adjustment of the force between the plurality of extendable brushes 262 and the plurality of conductor rails 122. The dynamic adjustment of force by the brush pressure control valve 322 may improve the quality of the energy transfer between the conductive rail system 120 and the rail connector assembly 200.

The quick retract valve 316 is a three-way, two-position solenoid valve with a bias spring for rapidly disengaging the plurality of extendable brushes 262 from the conductor rails 122 and retracting the plurality of connecting arms 242. In FIG. 3, the quick retract valve 316 is part of a regenerating fluid pathway that connects to the extend/retract valve 328 and extends to the fluid dryer 308 and accumulator tank 320. The quick retract valve 316 includes a resting or default state (the position shown in FIG. 3) in which the pressurized fluid is vented to the atmosphere and the filter dryer 308 is isolated from the remainder of the regenerating fluid pathway. In an actuated state, pressurized fluid is conveyed through the quick retract valve 316 to the filter dryer 308 via check valve 310 to regenerate the pressure of the accumulator tank 320.

FIG. 3 depicts the extend/retract valve 328 being connected as a gateway between the upstream pneumatic pressure system 222 and the downstream components (e.g., the connecting arm assembly 240 and the contactor assembly 260). In particular, the extend/retract valve 328 is connected to the upstream accumulator tank 320 and creates an extension fluid pathway for the downstream components (e.g., the connecting arm assembly 240 and the contactor assembly 260). The extension fluid pathway may include the extend/retract valve 328, the head portion 248, the plurality of telescoping cylinders 244, the plurality of piston rods 246, the brush pressure relay valve 330, the plurality of extendable brushes 262, and the plurality of airbags 264.

The extend/retract valve 328 may be fluidly coupled to the plurality of telescoping cylinders 244 and to the head portion 248 of each of the plurality of connecting arms 242. The extension fluid pathway further extends along the plurality of telescoping cylinders 244 to one of the piston rods 246. For example, the exemplary extension fluid pathway, as shown in FIG. 3, is connected to a center connecting arm 242 and extends along a portion of a corresponding piston rod 246. The piston rod 246 is fluidly coupled to the brush pressure relay valve 330, which controls the amount of pressurized fluid contained in the connected extendable brushes 262 and airbags 264.

Based on the amount of pressurized fluid present, the extendable brushes 262 may include different states of extension or retraction. The different states of extension may be measured in terms of the amount of extension from a bottom surface of the contactor assembly 240 to a bottom surface of an individual extendable brush 262. For example, the different states of extension or retraction may include a fully retracted state (not shown) in which the extendable brushes 262 are fully retracted within the contactor assembly 260 while the pressurized fluid of the contactor assembly is being vented into the atmosphere; an operating state (shown in FIG. 3) in which the bottom surfaces of the extendable brushes 262 are partially extended from the bottom surface of the contactor assembly 240 to contact the top surface of the conductor rails 122 during attachment; and a fully extended state (not shown) in which the bottom surfaces of the extendable brushes extended to a maximum length away from the bottom surface of the contactor assembly, with the maximum length of the extendable brushes in this state being greater than the partially extended length of the extendable brushes in the operating state. The plurality of airbags 264 and the plurality of extendable brushes 262 may have multiple pressure ranges based on their current state. For example, an operating pressure of 10-12 PSI may be exerted on the extendable brushes 262 in the operating state while a fully extended pressure of greater than 16 PSI may be exerted during the fully extended state to remove the brushes from the conductor rails 122. When actuated, the individual extendable brush 262, due to the expansion of the airbag 264, extends in a downward direction from the bottom surface of the contactor assembly 260 towards the top surface of the plurality of conductor rails 122.

In the example shown in FIG. 3, each individual brush 262 is generally disk-shaped. Each of the airbags 264 have a tubular or bulbous shape. The airbags 264 are fluidly connected to the fluid control system 300 and are configured to expand or retract within the body of the contactor assembly 260 based on the amount of pressurized fluid present, causing the extendable brush 262 to extend or retract within the body of the contactor assembly.

As shown in FIG. 3, the extend/retract valve 328 includes a five-way, two-position solenoid valve with a bias spring for controlling the flow of the pressurized fluid to and from the connecting arm assembly 240 and the contactor assembly 260. For example, the extend/retract valve 328 may include a resting or default state and an actuated state. In the default state, shown in FIG. 3, the brush pressure control valve 322 may be blocked or isolated, pressurized fluid from the accumulator tank 320 may be conveyed via valve 328 into the telescoping cylinders 244 proximal to the piston rods 246, and pressurized fluid from the head portion 248 may be recaptured by the control system 300 via the regenerating fluid pathway. Specifically, the regenerating pathway may include the extend/retract valve 328, the quick retract valve 316, the filter dryer 308, and the accumulator tank 320. In the actuated state, the solenoid of the extend/retract valve 328 is actuated against the bias spring, the position of valve 328 resulting in pressurized fluid being recirculated from the telescoping cylinders 244 (proximal to the piston rod 246) into the accumulator tank 320 (via the check valve 324). In the actuated state (not shown) of valve 328, pressurized fluid is also provided from the accumulator tank 320 to the head portion 248 of the plurality of connecting arms 242 to cause all of the connecting arms to extend in parallel. Lastly, in the actuated state of the extend/retract valve 328, the regenerating fluid pathway from the extend/retract valve to the quick retract valve 316 is blocked or isolated.

The brush pressure relay valve 330 links the extension fluid pathway from the piston rod 246 to the contactor assembly 260. As shown in FIG. 3, the brush pressure relay valve 330 includes a three-way, two-position solenoid valve with a bias spring with a resting or default state for allowing pressurized fluid into the extendable brushes 262 (via an input pathway) and an actuated state for venting the pressurized fluid to the atmosphere. To relieve the pressure of fluid within extendable brushes 262, the brush pressure relay valve 330 may include a maximum pressure threshold for releasing the pressure contained by the extendable brushes 262 and the airbags 264. For example, the maximum pressure threshold may be set to release the pressurized fluid at a pressure of 20 PSI. If the pressure of the fluid within the contactor assembly is less than the maximum pressure threshold, the solenoid remains in the resting or default position with the brush pressure relay valve 330 allowing pressurized fluid to be conveyed to the contactor assembly 260 and the atmospheric vent to be blocked. If the pressure of the extendable brushes 262 exceeds the maximum pressure threshold, the brush pressure relay valve 330 actuates, resulting in the extendable brushes 262 and the airbags 264 of the contactor assembly 260 being isolated from the extension fluid pathway and the pressurized fluid being vented to the atmosphere.

INDUSTRIAL APPLICABILITY

The disclosed aspects of the fluid control system above can be used for conveying pressurized fluid to a connecting arm assembly and to a contactor assembly for electrically connecting to a conductive rail system. For example, the drawings generally depict a mobile machine with a rail connector assembly and a fluid control system designed to manipulate the rail connector assembly by conveying the pressurized fluid throughout the control system and extending or retracting various connecting arms and extendable brushes.

During operation of the fluid control system 300, fluid is drawn into the pneumatic pressure system 222 via the air intake filter 302, which prevents particulate matter from entering the control system 300. The filtered fluid (e.g., air) is compressed by the air compressor 304 and transferred to the filter dryer 308. In the filter dryer 308, residual moisture is extracted from the air or other fluid and purged from the fluid control system 300 via the purge valve 312. The dry pressurized fluid is conveyed to the accumulator tank 320.

Once in the accumulator tank 320, the pressurized fluid may be stored within the tank until needed in the downstream components (e.g., the connecting arm assembly 240 and the contactor assembly 260). The accumulator tank 320 is hysteretically linked to the air compressor 304 based on the pressure present in the tank. If the pressure within the accumulator tank 320 exceeds a maximum pressure threshold, the pressure switch 314 will actuate and pause the operation of the air compressor until the pressure within the tank 320 has been sufficiently reduced. In instances where the pressure of the accumulator tank 320 greatly exceeds the maximum pressure threshold, the operator may manually actuate the safety relief valve 318 and vent the pressurized fluid into the atmosphere. The pressurized fluid of the accumulator tank 320 may be output to the extend/retract valve 328, based on the requirements of the downstream components.

The extend/retract valve 328 functions as a midpoint between the regenerating fluid pathway and the extension fluid pathway for the downstream components. In its resting or default setting, the extend/retract valve 328 facilitates the retracted state of connecting arms 242. With valve 328 in this position, pressurized fluid flows from the connecting arm assembly 240 and the contactor assembly 260 towards the quick retract valve 316 of the regenerating fluid pathway. As shown in FIG. 3, the quick retract valve 316 may vent the pressurized fluid into the atmosphere and result in a quick retracted state with a shorter retraction period for increased safety. During a retraction, the quick retract valve 316 may be actuated, such that pressurized fluid flows through the quick retract valve 316 and the filter dryer 308 before being stored within the accumulator tank 320. With this regenerating fluid pathway, any latent moisture in the pressurized fluid may be removed and purged while maintaining adequate system pressure in the accumulator tank 320.

When extending the connecting arm assembly 240, the extend/retract valve 328 is actuated such that the fluid from the accumulator tank 320 is directed to the head portions 248 of the connecting arms 242. The pressurized fluid, with an extension pressure of approximately 50 PSI, enters the telescoping cylinders 244 and the piston rod 246, and extends the connecting arms 242 simultaneously and in parallel. By limiting the extension pressure to approximately 50 PSI, the system 300 is able to quickly refill the accumulator tank 320 after extending the connecting arm assembly 240, thereby boosting system efficiency and economizing the system air requirements. Once the connecting arms 242 are fully extended, the brush pressure relay valve 330 receives the pressurized fluid and begins to modulate or reduce the pressure for the airbags 264 and the extendable brushes 262. For example, during standard operation, the plurality of extendable brushes 262 and the plurality of airbags 264 may have a nominal pressure range of 5-12 PSI, resulting in the brushes 262 partially extending from the contactor assembly 260 in order to contact a top surface of the conductor rails 122 and conduct electrical energy to the mobile machine. When the pressure of the brushes and the airbags is less than 20 PSI, the brush pressure relay valve 330 allows for direct commutation between the brush pressure control valve 322 and the extendable brushes 262. It should be noted that during standard operation, the contactor assembly 260 may be attached to the conductor rails 122 by an adhesion force, such as the combination of a gravitational force of the mass of the contactor assembly and a magnetic force due to magnets (not shown) integrated within the contactor assembly.

In order to disengage the extendable brushes 262 from the plurality of conductor rails 122, the brush pressure relay valve 330 may momentarily increase pressure within the airbags 264 ("disengaging force"). Generally, the disengaging pressure necessary for the extendable brushes 262 to overcome the adhesion force is approximately 15-16 PSI. By momentarily increasing the disengaging pressure to the extendable brushes 262 (e.g., to a maximum value), the disengaging pressure will exceed the permissible pressure limit of 20 PSI and the brushes fully extend out from contactor assembly 260 against the top surface of the conductor rails 122, resulting in a gap between the conductor rails and the magnets of the contactor assembly. As discussed above, the extend/retract valve 328 may then return to its resting or default state, resulting in the pressurized fluid from the components downstream of extend/retract valve flowing toward the extend/retract valve and resulting in retraction of the telescoping cylinders 244 and retraction of the piston rod 246 (e.g., away from the plurality of conductor rails 122). When the disengaging force is momentarily increased to its maximum value, the brush pressure relay valve 330 actuates, isolating the contactor assembly 260 and venting the pressurized fluid to the atmosphere. By venting the pressurized fluid to the atmosphere, the extendable brushes 262 may be retracted into the contactor assembly.

In accordance with the present disclosure, a fluid control system for a mobile machine allows for a rail connector assembly, specifically a connecting arm assembly and a contactor assembly, to engage and disengage with conductor rails by extending or retracting a plurality of connecting arms or a plurality of extendable brushes through the use of a pressurized fluid. The fluid control system allows for the application of a constant force of pressure along the connecting arm assembly and the contactor assembly, providing a nimble and responsive rail connector assembly. The fluid control system also provides for a structure that minimizes complexity, while simultaneously providing additional functionality, such as the use of compressed air to disengage the extendable brushes allows for the safe removal from the conductor rails.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A pneumatic control system for a mobile machine energy transfer system, the mobile machine energy transfer system including a boom, a connecting arm assembly including a plurality of connecting arms, and a contactor assembly including a plurality of extendable brushes, the pneumatic control system including:

a compressor configured to pressurize a fluid;

an accumulator configured to store the pressurized fluid from the compressor; and an pneumatic control valve for controlling movement of the plurality of connecting arms and movement of the plurality of extendable brushes, wherein the pneumatic control valve includes an extension fluid pathway for conveying the pressurized fluid from the accumulator to the plurality of extendable brushes, wherein the extension fluid pathway fluidly connects the pneumatic control valve to at least one of the plurality of connecting arms or to the plurality of extendable brushes.

2. The pneumatic control system of claim 1, wherein the pneumatic control valve is fluidly connected downstream of the accumulator and upstream of the extension fluid pathway.

3. The pneumatic control system of claim 1, wherein the extension fluid pathway connects the pneumatic control valve to a head portion of each connecting arm.

4. The pneumatic control system of claim 1, the plurality of connecting arms including a plurality of telescoping cylinders and a plurality of piston rods, wherein the plurality of telescoping cylinders and the plurality of piston rods are configured to extend based on a presence of pressurized fluid within the extension fluid pathway.

5. The pneumatic control system of claim 1, the contactor assembly also including a plurality of airbags, wherein the plurality of airbags are in fluid communication with the connecting arm assembly, and wherein the plurality of airbags expand according to a presence of pressurized fluid within the extension fluid pathway.

6. The pneumatic control system of claim 5, wherein the extension fluid pathway includes a brush pressure relay valve connected to a piston rod of the connecting arm assembly and to the plurality of airbags, the brush pressure relay valve configured to regulate the pressure of pressurized fluid provided to the plurality of airbags and to the plurality of extendable brushes.

7. The pneumatic control system of claim 6, the brush pressure relay valve including an resting state and an actuated state:

wherein, when in the resting state, the brush pressure relay valve allows a flow of pressurized fluid into the contactor assembly and, when in the actuated state, the brush pressure relay valve blocks pressurized fluid from entering the extension fluid pathway and the pressurized fluid contained within the contactor assembly is vented to the atmosphere by a relief valve.

8. The pneumatic control system of claim 1, the plurality of extendable brushes including an operating state and a fully extended state, wherein, in the operating state, the plurality of extendable brushes are partially extended from the contactor assembly to contact a plurality of conductor rails and, in the fully extended state, the plurality of extendable brushes extend to a maximum length that is greater than a length the brushes extend when partially extended to disconnect the contactor assembly from the plurality of conductor rails.

9. The pneumatic control system of claim 8, wherein, in the fully extended state, the pressure within the plurality of extendable brushes is greater than 16 pounds per square inch.

10. A pneumatic control system for a mobile machine energy transfer system, the mobile machine energy transfer system including a boom, a connecting arm assembly including a plurality of connecting arms, and a contactor assembly including a plurality of extendable brushes, the pneumatic control system including:

a compressor configured to pressurize fluid;

an accumulator configured to store the pressurized fluid; and a pneumatic control valve for controlling movement of at least one of the plurality of connecting arms or the plurality of extendable brushes, wherein the compressor, the accumulator, and the pneumatic control valve are connected along a first fluid pathway for conveying the pressurized fluid to at least one of the connecting arm assembly or the contactor assembly, and wherein the pneumatic control valve includes a second fluid pathway, different from the first fluid pathway, for conveying the pressurized fluid away from the connecting arm assembly and away from the contactor assembly.

11. The pneumatic control system of claim 10, the first fluid pathway including a head portion, a piston rod of at least one connecting arm, and the plurality of extendable brushes, wherein the presence of pressurized fluid in the first fluid pathway is configured to extend the plurality of connecting arms and the plurality of extendable brushes.

12. The pneumatic control system of claim 10, the first fluid pathway including a brush pressure relay valve;

the plurality of connecting arms each including a piston rod; and the contactor assembly including a plurality of airbags in fluid communication with the plurality of extendable brushes, wherein the brush pressure relay valve is in fluid communication with the piston rod and with the plurality of airbags.

13. The pneumatic control system of claim 10, the second fluid pathway including a retraction valve, wherein the retraction valve includes a resting state and an actuated state.

14. The pneumatic control system of claim 13, the retraction valve further including a relief valve, wherein, when the retraction valve in the resting state, pressurized fluid within the second fluid pathway is vented to the atmosphere by the relief valve.

15. The pneumatic control system of claim 13, wherein, when in the actuated state, pressurized fluid circulated within the second fluid pathway is conveyed through the retraction valve to the accumulator.

16. The pneumatic control system of claim 10, wherein the plurality of connecting arms extend and retract in parallel due to a presence of pressurized fluid.

17. A pneumatic control system for a mobile machine energy transfer system, the mobile machine energy transfer system including a boom, a connecting arm assembly including a plurality of connecting arms, and a contactor assembly including a plurality of extendable brushes, the pneumatic control system including:

a compressor, wherein the compressor is configured to pressurize fluid;

an accumulator;

a pneumatic control valve for controlling flow of the pressurized fluid into the plurality of connecting arms and for the plurality of extendable brushes; and a brush pressure relay valve for regulating pressure of the pressurized fluid within the plurality of extendable brushes of the contactor assembly.

18. The pneumatic control system of claim 17, wherein the brush pressure relay valve including a resting pressure state and an actuated pressure state, the resting pressure state includes an input pathway for the pressurized fluid to be conveyed into the plurality of extendable brushes and the actuated pressure state includes an isolated pathway that prevents flow of the pressurized fluid from entering the contactor assembly.

19. The pneumatic control system of claim 18, wherein, in the resting pressure state, a relief valve of the brush pressure relay valve is isolated from the pressurized fluid and from the input pathway.

20. The pneumatic control system of claim 19, wherein, in the actuated pressure state, the pressurized fluid contained within the contactor assembly is vented to the atmosphere by a relief valve.

* * * * *